(12) United States Patent
Levi

(10) Patent No.: US 10,470,565 B1
(45) Date of Patent: Nov. 12, 2019

(54) FOLDABLE SHELVING CONSTRUCTION

(71) Applicant: ROM ACQUISITION CORPORATION, Belton, MO (US)

(72) Inventor: Avraham Y. Levi, Eagan, MN (US)

(73) Assignee: ROM ACQUISITION CORPORATION, Belton, MO (US)

( * ) Notice: Subject to any disclaimer, the term of this patent is extended or adjusted under 35 U.S.C. 154(b) by 0 days.

(21) Appl. No.: 16/437,014

(22) Filed: Jun. 11, 2019

(51) Int. Cl.
| | |
|---|---|
| *A47B 43/00* | (2006.01) |
| *A47B 95/00* | (2006.01) |
| *A47B 46/00* | (2006.01) |
| *A47B 57/42* | (2006.01) |
| *B60R 7/08* | (2006.01) |

(52) U.S. Cl.
CPC ............. *A47B 43/00* (2013.01); *A47B 46/00* (2013.01); *A47B 57/42* (2013.01); *A47B 95/00* (2013.01); *B60R 7/08* (2013.01)

(58) Field of Classification Search
CPC ....... A47B 57/42; A47B 57/425; A47B 57/56; A47B 57/565; A47B 57/567; A47B 46/00; A47B 43/00; A47B 96/061
See application file for complete search history.

(56) References Cited

U.S. PATENT DOCUMENTS

| | | | | |
|---|---|---|---|---|
| 919,526 | A * | 4/1909 | Belcher .................. | A47B 57/42 108/108 |
| 1,347,116 | A * | 7/1920 | Henry .................. | A47B 46/005 248/240.4 |
| 2,788,949 | A * | 4/1957 | Gurries ................ | A47B 57/045 248/242 |
| 2,837,219 | A * | 6/1958 | Ferdinand ............ | A47B 57/485 108/65 |
| 2,905,424 | A * | 9/1959 | Snow .................... | A47B 46/005 248/240.4 |
| 3,097,822 | A * | 7/1963 | Attwood ............... | A47B 57/045 248/250 |
| 3,371,798 | A * | 3/1968 | D Altrui .............. | A47B 57/485 211/182 |

(Continued)

FOREIGN PATENT DOCUMENTS

| | | | | |
|---|---|---|---|---|
| DE | 102011013078 A1 | * 10/2012 | ........... | A47B 96/061 |
| EP | 0294273 A1 | * 12/1988 | ........... | A47B 96/061 |

(Continued)

*Primary Examiner* — Stanton L Krycinski
(74) *Attorney, Agent, or Firm* — DeWitt LLP; Thomas J. Nikolai

(57) ABSTRACT

A shelving unit adapted for attachment to a vertical surface has a plurality of square cross-section tubes that are to be attached vertically the surface. The tubes have slots arranged in horizontal pairs in vertically spaced relation along the length of the tubes. Fitted into the slots are L-shaped steel plates having first and second legs. The first legs are pivotally mounted within the tubes to swing through the slots. A stop is provided causing the second leg to extend perpendicularly to a front side of the square tubes. Sandwiched between the second legs of each adjacent pair of plates are shelf supports for rectangular shelves. The pivotal mount of the plate pairs allows a shelf to be shifted from a horizontal and vertical disposition. Spring latches attached to the tubes serve to releasably secure the shelves in their vertical disposition.

4 Claims, 6 Drawing Sheets

(56) References Cited

U.S. PATENT DOCUMENTS

| | | | | |
|---|---|---|---|---|
| 3,512,654 A * | 5/1970 | Jay | A47B 57/485 | 211/193 |
| 3,525,442 A * | 8/1970 | Novales | A47B 57/30 | 211/193 |
| 3,602,374 A * | 8/1971 | Alabaster | A47B 57/485 | 211/193 |
| 3,710,734 A * | 1/1973 | Bofferding | A47B 57/56 | 108/108 |
| 3,747,777 A * | 7/1973 | Kane | A47B 57/30 | 211/193 |
| 3,794,183 A * | 2/1974 | Colbridge | A47B 46/00 | 211/208 |
| 4,205,815 A * | 6/1980 | Sauer | A47B 57/42 | 211/192 |
| 5,092,546 A * | 3/1992 | Wolfbauer | F16L 3/22 | 211/193 |
| 5,388,796 A * | 2/1995 | Sullivan | A47B 57/567 | 108/108 |
| 5,452,875 A * | 9/1995 | Kern | A47B 57/045 | 108/108 |
| 5,695,163 A * | 12/1997 | Tayar | A47B 57/485 | 248/225.21 |
| 6,082,690 A * | 7/2000 | Durin | H02G 3/263 | 211/90.01 |
| 6,722,620 B2 * | 4/2004 | Rieger | A47B 57/045 | 248/235 |
| 7,165,689 B2 * | 1/2007 | McDaniel | A47B 96/061 | 211/116 |
| 7,360,627 B2 * | 4/2008 | Scott | A47B 96/061 | 182/82 |
| 7,757,615 B2 * | 7/2010 | McDonald, II | A47B 57/20 | 108/108 |
| 8,038,112 B2 * | 10/2011 | Kluge | A47B 96/1466 | 248/235 |
| 8,567,734 B2 * | 10/2013 | McCoy | F16L 3/223 | 211/186 |
| 9,044,090 B2 * | 6/2015 | Drake | A47B 57/34 | |
| 10,201,227 B2 * | 2/2019 | Kohshima | A47F 5/103 | |
| 10,258,152 B1 * | 4/2019 | Lentine | A47B 96/025 | |
| D857,481 S * | 8/2019 | Lentine | A47B 43/00 | D8/354 |
| 2015/0366338 A1 * | 12/2015 | Conod | A47B 47/0083 | 108/48 |
| 2019/0254422 A1 * | 8/2019 | Beere | A47B 43/00 | |

FOREIGN PATENT DOCUMENTS

| | | | | |
|---|---|---|---|---|
| EP | 1245171 A1 * | 10/2002 | | A47B 57/42 |
| FR | 2873905 A1 * | 2/2006 | | A47B 57/045 |
| GB | 330741 A * | 6/1930 | | A47B 96/061 |
| GB | 781462 A * | 8/1957 | | A47B 46/005 |
| WO | WO-03016790 A1 * | 2/2003 | | A47B 96/061 |

* cited by examiner

FOLDABLE SHELVING CONSTRUCTION

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates generally to shelving constructions and, more particularly, to a shelving construction where individual shelf members can be readily shifted between a vertical, spaced-saving disposition and a deployed, horizontal disposition.

II. Discussion of the Prior Art

It is known in the art to have shelving installed in commercial vehicles such as vans, whereby packages, toolboxes and a variety of items can be loaded, transported and unloaded. When it is considered that such shelving must be capable of supporting loads weighing hundred of pounds, the prior art has resorted to the use of cables and braces that extend diagonally from a tie point located directly above a rear edge of the shelf to a tie point on or near a front edge of the shelf. These support structures tend to interfere with the ability to slide load items along the length of the dimension of the shelves.

I have devised a shelving construction that is well-suited for use in commercial vans and that can also find use in stationary structures where the shelves can be deployed in a horizontal disposition when storing load items, but can readily be shifted to a collapsed vertical disposition so as not to occupy usable space when unloaded. In addition, the shelving construction disclosed herein is capable of supporting substantial loads without the necessity of having shelf support cables or braces found on most foldable shelving of the prior art.

SUMMARY OF THE INVENTION

In accordance with the present invention, there is provided a shelving construction adapted for attachment to a generally planar wall surface. It comprises a plurality of elongate tubes, each having a rectangular cross-section exhibiting a front surface, a rear surface and first and second opposed side surfaces. The tubes are adapted to be attached to a wall surface in a vertical and spaced-apart, parallel orientation. Each of these tubes includes vertically spaced-apart pairs of horizontally aligned slots that are formed through the front surface of each of the plurality of tubes. A plurality of generally L-shaped plates, each have a first leg thereof fitted individually into said slots, are pivotally secured therein by a first set of bolts that extend through aligned apertures in the first leg of the plates and through first and second opposed side surfaces of the tubes.

A second set of bolts extend through aligned apertures in the first and second opposed side surfaces of the tubes and the second set of bolts are vertically offset from the first set by a distance whereby a second leg of the L-shaped plates extends perpendicularly from the first surface of the tubes when the L-shaped plates engage the second set of bolts.

Sandwiched between the second legs of the plates that extend out from the pairs of horizontally aligned, vertically spaced slots are elongate shelf support members onto which the shelf members are affixed. Given the pivotal connection of the first legs of the L-shaped plates to the first set of bolts, the shelves can be rotated from a horizontal disposition to a vertical disposition. A latch assembly is provided for releasably holding shelves in their vertical disposition.

BRIEF DESCRIPTION OF THE DRAWINGS

The foregoing features, objects and advantages of the invention will become apparent to those skilled in the art from the following detailed description of the preferred embodiment, especially when considered in conjunction with the accompanying drawings in which like numerals in the several views refer to corresponding parts.

DESCRIPTION OF THE PREFERRED EMBODIMENT

Figure 1:
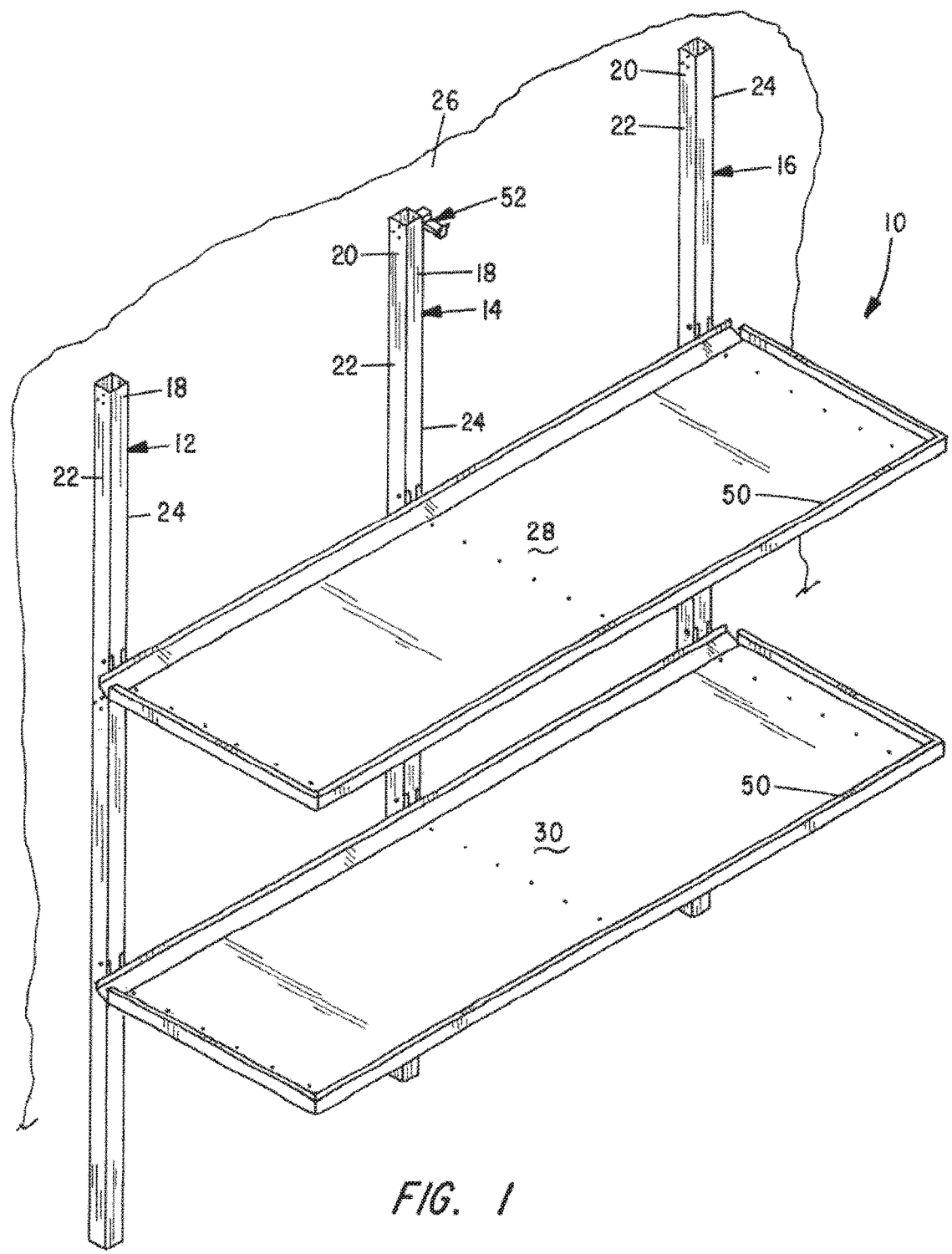
FIG. 1 is a perspective view of a preferred embodiment of the present invention with the shelves deployed to their load bearing disposition.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Referring first to the perspective view of FIG. 1, a shelving unit indicated generally by numeral 10 is seen to comprise a plurality of elongate tubes 12, 14 and 16, each having a rectangular cross-section. Each of these tubes has a front surface 18, a rear surface 20 and first and second side surfaces 22 and 24. As illustrated, the tubes are adapted to be attached to a wall surface 26 in a vertical and spaced-apart parallel orientation. Pivotally secured to the tubular posts 12, 14 and 16 are shelf members, as at 28 and 30. The manner in which the connection is made will now be described with greater particularity.

Figure 2:
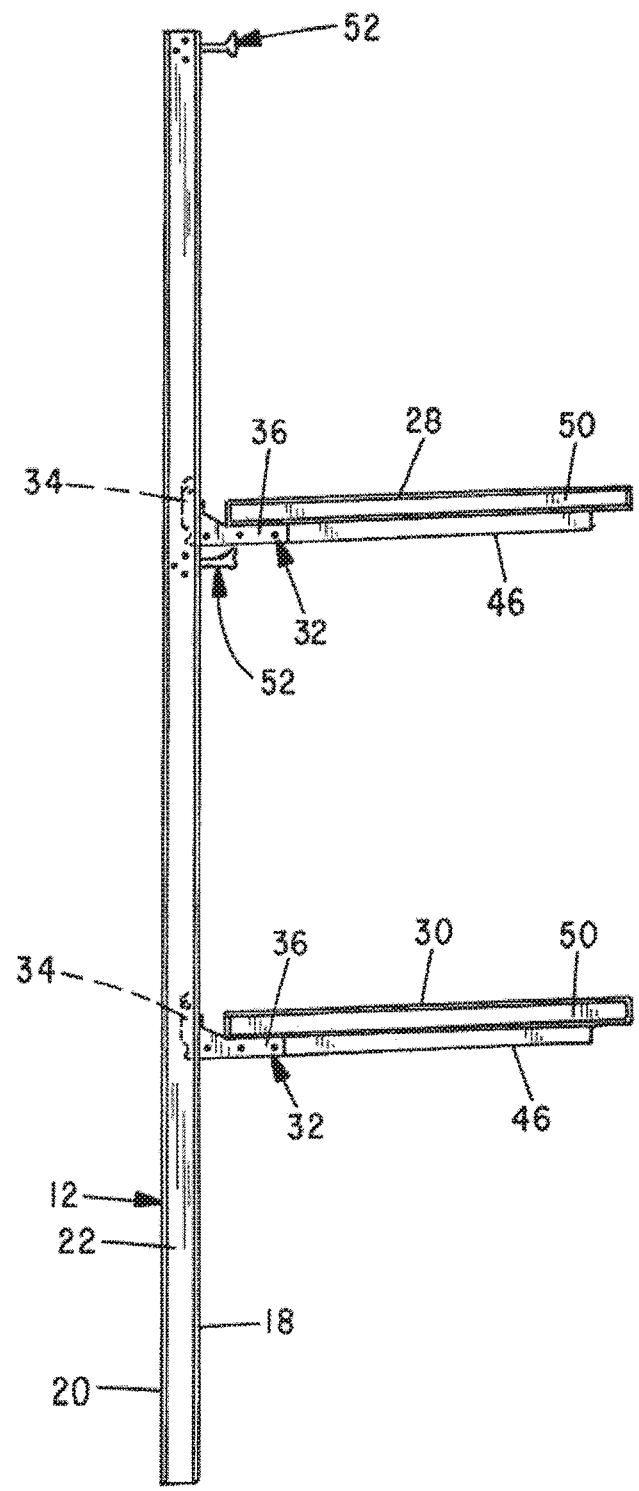
FIG. 2 is a side elevation thereof.

Referring to FIG. 2, it shows the vertical square tubing member 12 with the shelves 28 and 30 pivotally joined thereto by steel L-shaped plates 32, each with first and second legs 34 and 36.

Figure 4:
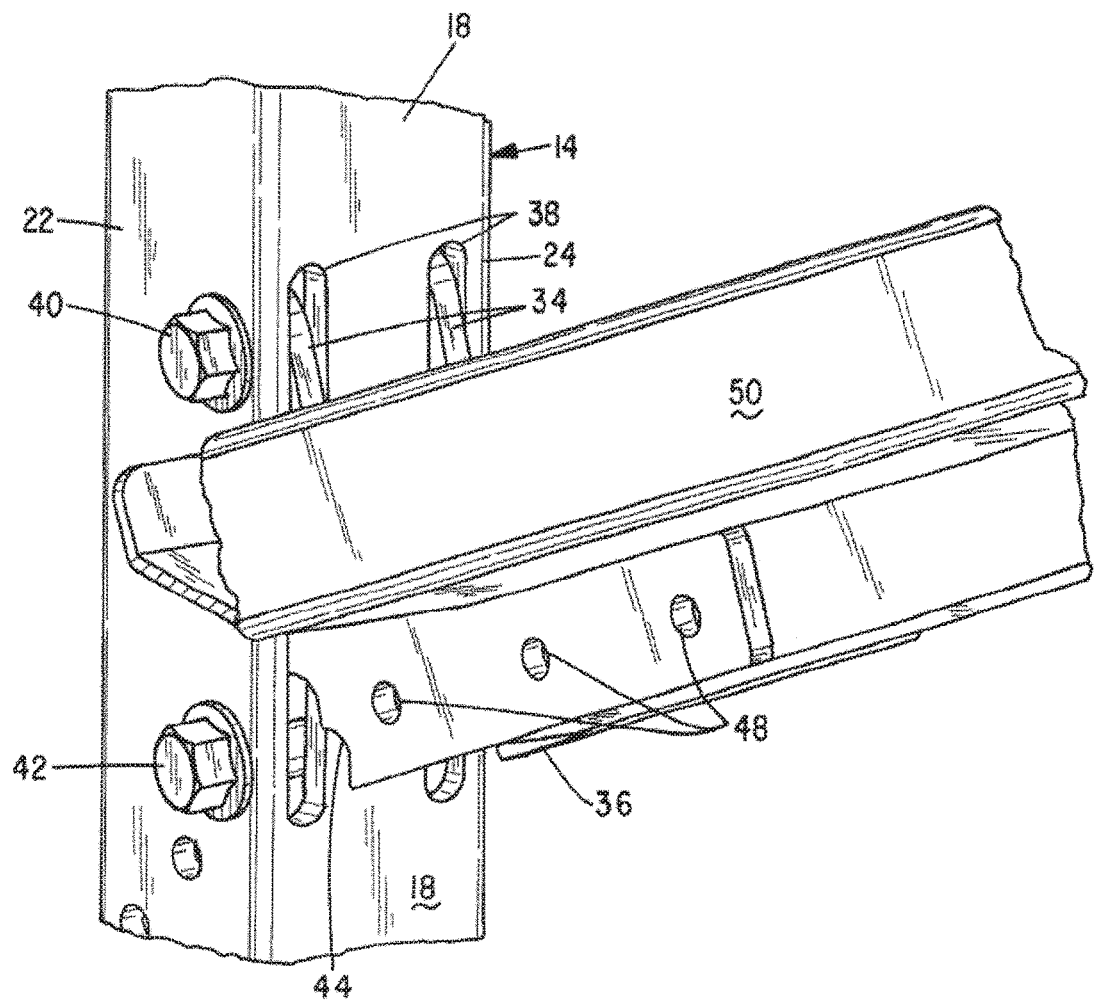
FIG. 4 is an enlarged detailed view illustrating how the shelves are joined to their vertical support members.
Figure 5:
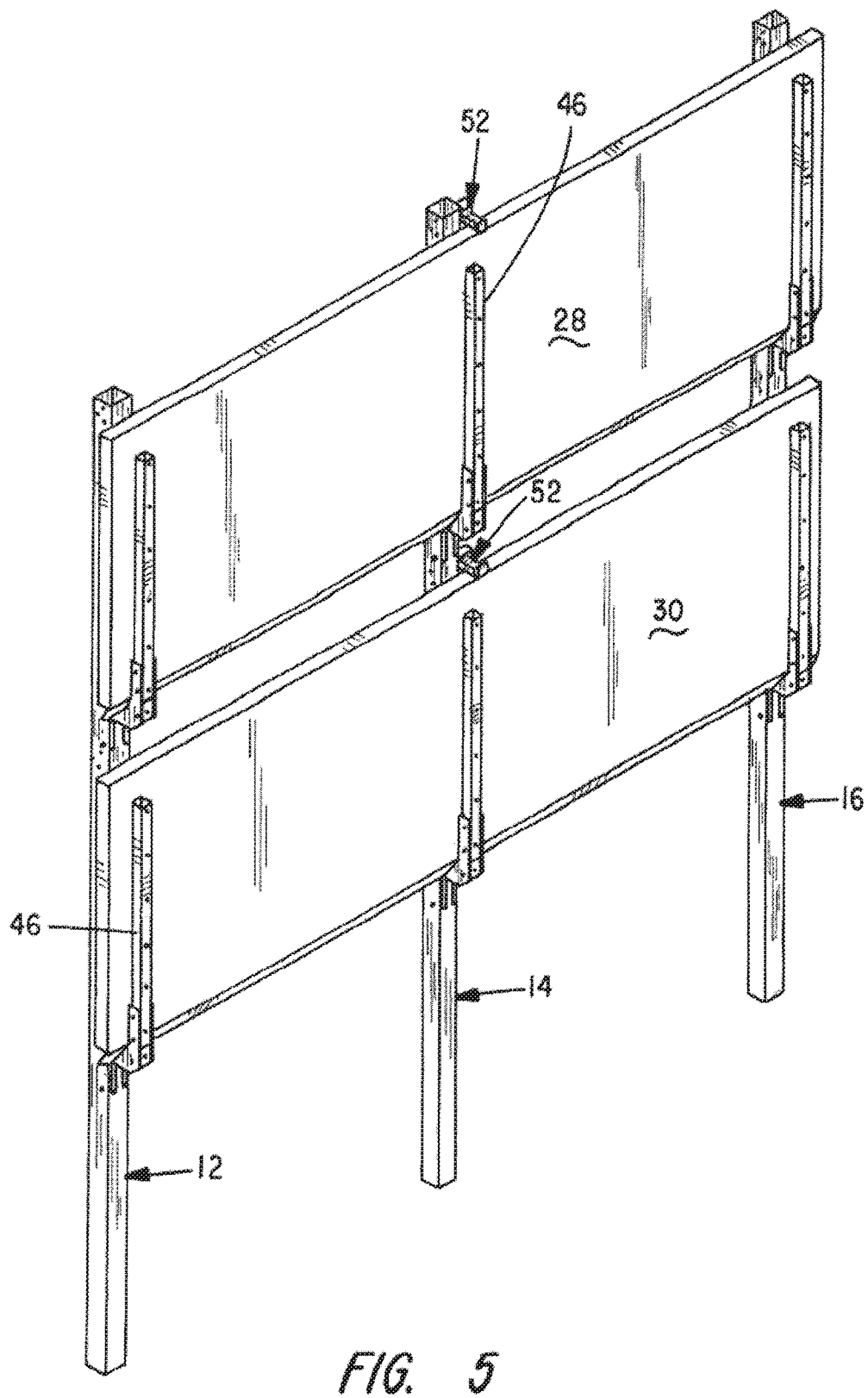
FIG. 5 is a perspective view of the shelving assembly with the shelves latched in their vertical disposition.

Turning momentarily to the detailed view of FIG. 4, it shows a typical square tube, e.g., tube 12, whose front face 18 includes a pair of horizontally aligned, vertically extending slots 38. Extending through these slots is a pair of identical L-shaped plates 32 which are preferably formed from 6 gauge stainless steel, which resists deformation under very heavy loading. More particularly, the first legs 34 of these plates extend through the slots 38 and are arranged to pivot about a bolt 40 that passes through a series of aligned apertures formed through the side walls 22 and 24 and through apertures formed in the first legs of each of the plates 32. This pivot connection permits the plates to swing in the slots 38.

A further bolt 42 extends through aligned apertures in the side walls 22 and 24 of the square tubing which are vertically offset from the first bolts 40 by a distance whereby a second leg of the L-shaped plates will extend perpendicularly from the surface 18 of the vertically extending tubes when the L-shaped plates engage the bolts as at 42. As seen in FIG. 4, the L-shaped plates are carved out as at 44 so as to conform to the contour of the cylindrical bolt 42.

Sandwiched between the second legs of a pair of the adjacent plates 32 are shelf support members 46 which also preferably comprises a length of square aluminum tubing. The shelf support members are held in place by screws or bolts as at 48 in FIG. 3.

The shelf members comprise a planar sheet, preferably of aluminum, of a length dimension sufficient to span a plurality of the support members and of a predetermined width dimension. The shelves are bent or otherwise formed so as to exhibit a peripheral wall 50.

Figure 3:
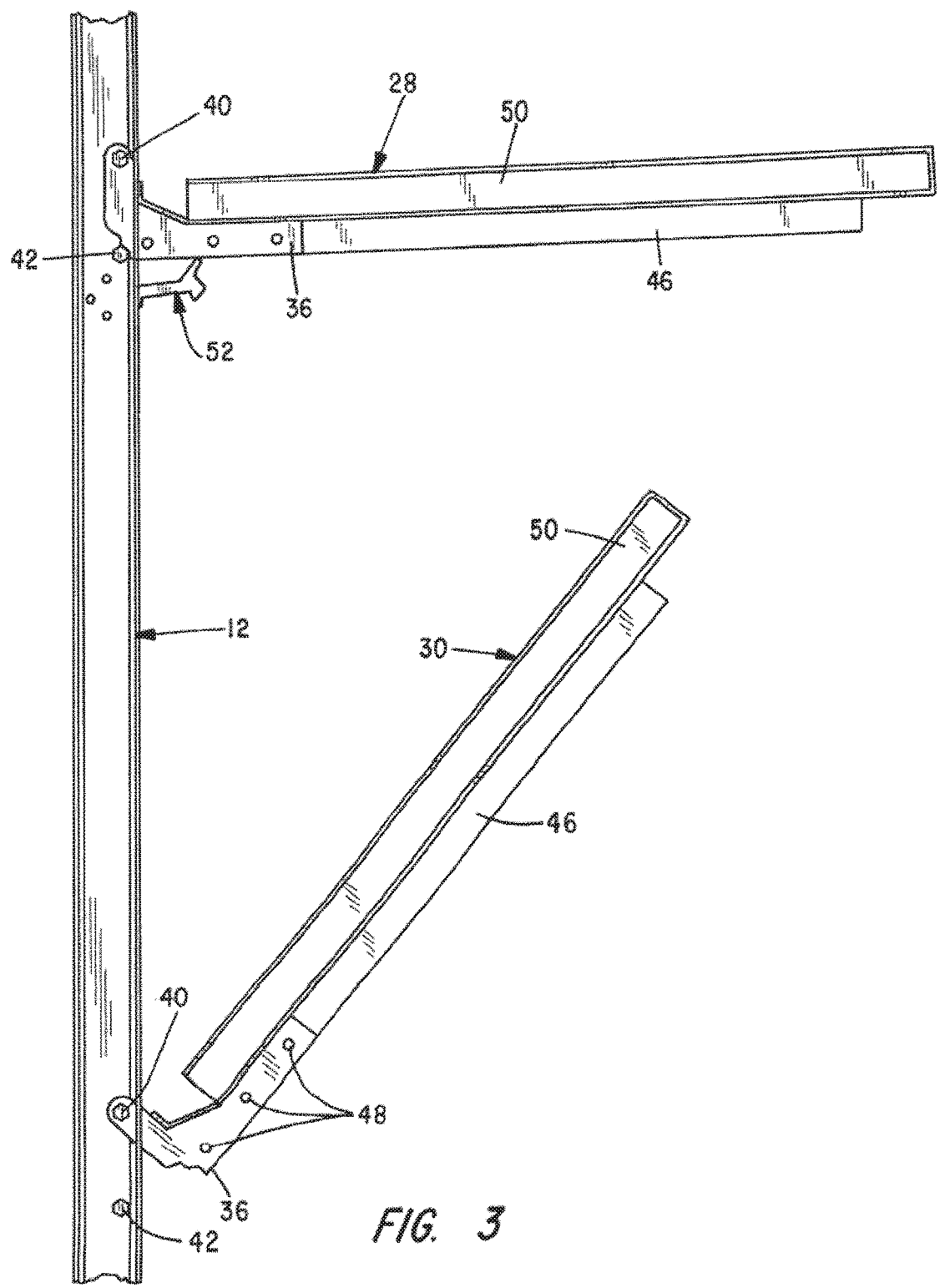
FIG. 3 is a further side elevation showing the lower shelf unit being rotated to its vertical disposition.
Figure 6:
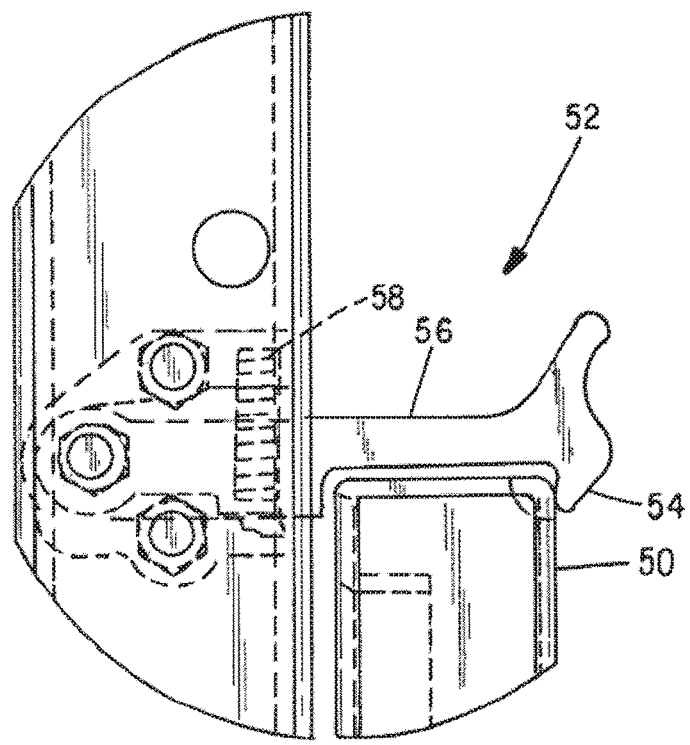
FIG. 6 is a drawing of the latch assembly employed.

As shown in FIG. 3, a latch assembly 52 is affixed to the square tubing member 12 and used to secure a shelf in its stored disposition. FIG. 6 is a detailed view of the spring biased latch. From FIG. 6, it can be appreciated that, as a shelf wall 50 is made to swing into its vertical orientation, it first engages a cam surface 54 causing the latch 56 to rise against the force of a coil spring 58 to compress the spring until the outermost wall of the tray drops into a notch formed in the bottom of the latch member 56.

It will be obvious to those skilled in the art that various changes may be made without departing from the scope of the invention as defined by the claims.

What is claimed is:

1. A shelving construction for attachment to a generally planar wall surface comprising:
   (a) a plurality of elongate tubes each having a rectangular cross-section of mutually perpendicular front surface, rear surface and first and second opposed side surfaces, said tubes adapted to be attached to said wall surface in a vertical and spaced-apart, parallel orientation and where vertically spaced-apart pairs of horizontally aligned slots are formed through the front surface of each of the plurality of tubes;
   (b) a plurality of generally L-shaped plates, each having a first leg fitted individually into said slots and pivotally secured therein by a first set of bolts extending through aligned apertures in said first leg of said plates and said first and second opposed side surfaces of the tubes;
   (c) a second set of bolts extending through aligned apertures in the first and second opposed side surfaces of said tubes and vertically offset from the first set of bolts by a distance whereby a second leg of the L-shaped plates extends perpendicularly from the first surfaces of said tubes when the L-shaped plates engage the second set of bolts;
   (d) a shelf support member sandwiched between second legs of the plates extending out from the pairs of horizontally aligned, vertically spaced slots; and
   (e) shelf members affixed to the shelf support members.

2. The shelving construction of claim 1 wherein the shelf member comprises a rectangular sheet member affixed to a predetermined number of horizontally aligned shelf support members.

3. The shelving construction of claim 2 and further including a wall integrally formed with the rectangular sheet member along at least three sides of the rectangular sheet member.

4. The shelving construction of claim 2 and further including spring biased latch lever assemblies affixed to at least one of said plurality of elongate tubes for releasably engaging the shelf members when the shelf members are pivoted about said first set of bolts to a vertical orientation.

\* \* \* \* \*